Jan. 9, 1968  J. PERRET  3,362,154

WATERTIGHT CONTROL DEVICE, WITH PUSH-BUTTON, FOR TIMEPIECE
Filed March 16, 1966

INVENTOR
Jean PERRET

United States Patent Office 3,362,154
Patented Jan. 9, 1968

3,362,154
WATERTIGHT CONTROL DEVICE, WITH PUSH-BUTTON, FOR TIMEPIECE
Jean Perret, Geneva, Switzerland, assignor to Montres Rolex S.A., Geneva, Switzerland, a firm of Switzerland
Filed Mar. 16, 1966, Ser. No. 534,749
6 Claims. (Cl. 58—90)

ABSTRACT OF THE DISCLOSURE

A watertight control device for a timepiece in which a stem of a push-button is slidably mounted in a tube secured to the timepiece case with a deformable sealing joint interposed between a shoulder on the stem and an inner edge of the tube, a hollow head being mounted on the setm and engaging the outer surface of the tube so as to be axially displaceable along said tube but non-rotatable relative thereto such that when a sleeve which is threadably engaged with the outer surface of the tube is moved to an operative position in which the sleeve bears on the case, a force is exerted on the stem on the one hand to compress the sealing joint between the shoulder on the stem and the inner edge of the sleeve and on the other hand to lock the push-button, whereas when the sleeve is moved to a rest position away from the case, the sleeve allows free axial movement of the push-button.

---

Figure 1:
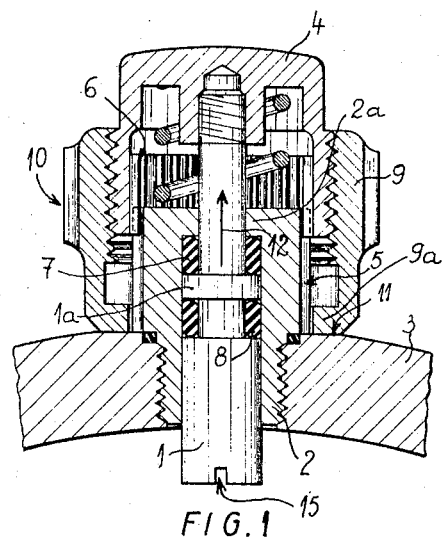

The present invention relates to a watertight control device, with push-button, for a timepiece.

The devices of this type, merely called "push-buttons," give rise to a difficulty relating to their watertightness. This problem is generally solved by arranging one or more annular waterproof packings or joints on the stem of the push-button and which ensure, by their radial action, the tightness between this stem and the watch case or a sleeve carried by the watch case. In some cases, the radial pressure exerted by the waterproof joint on the stem of the push-button, or on the head of the push-button, is produced by an axial pressure applied to the said joint and which urges it to crush radially.

However, in these devices, the axial pressure is produced either by a spring, the force of which is limited by the fact that the push-button has to remain free for operation, or by a tightening operation carried out during the mounting of the timepiece. In this case, the force does not increase when the packing starts to callapse or when some wear occurs.

As a result therefrom, the watertight push-buttons are reliable only for relatively low pressures and are not suitable for timepieces which have to work under high pressures, as is the case for example, of watches for underwater divers.

An object of the present invention is the provision of a watertight control device, with push-button, giving an operating reliability greater than the known devices and which is adapted to keep its tightness under very high pressures.

This device is characterized by the fact that it comprises a sleeve screwed on the push-button and adapted to occupy two positions, one being a rest position, in which the sleeve allows said push-button to move freely, and the other being a working position, in which the sleeve bears on a part of the casing of the timepiece in such a way as to exert on the push-button an axial force which is effective on the one hand to compress a waterproof joint interposed between the said push-button and the casing and on the other hand to lock the push-button, means being provided for preventing rotation of the push-button relative to the casing, thus allowing displacement of said sleeve on the push-button by turning the sleeve relatively thereto.

The drawing shows, by way of example, one embodiment of the invention.

Figure 2:
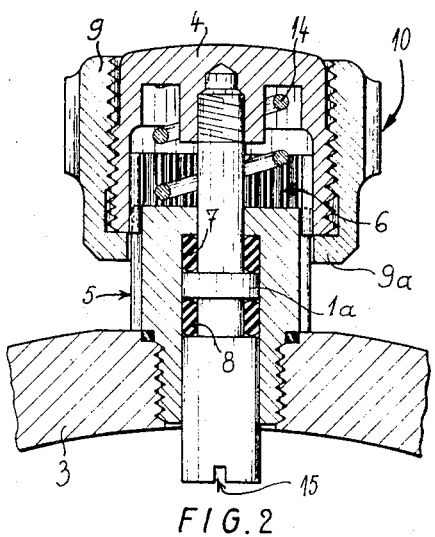
Figure 3:
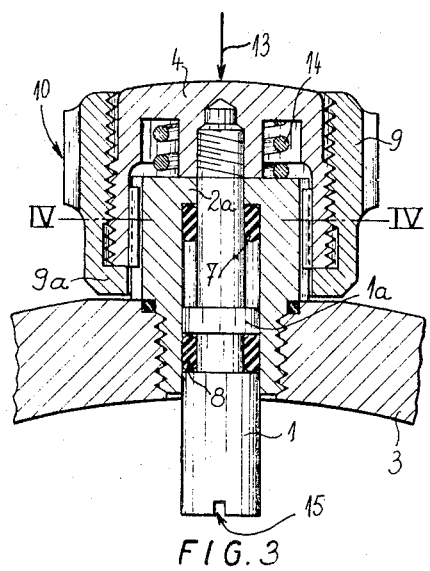
Figure 4:
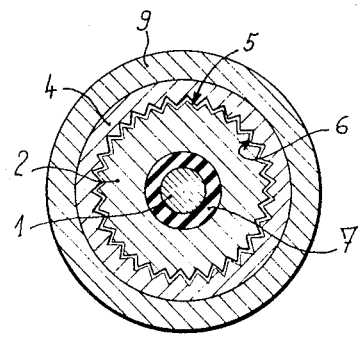

FIGS. 1, 2 and 3 are three axial sectional views of a watertight control device for a timepiece, and FIG. 4 is a sectional view along line IV—IV of FIG. 3.

The device comprises a stem 1 passing through a tube 2 screwed in the rim of the watch case, designated by 3. This stem 1 carries, screwed on its outer extremity, a head 4, which is hollow, engaged on the tube 2. The head 4 and the stem 1 constitute together a push-button. The tube 2 is corrugated outwardly at 5, while the head 4 is inwardly corrugated at 6 so that the head 4 can move axially freely while being prevented from rotating.

Two annular waterproof joints 7 and 8 are located in the tube 2 and are passed through by the stem 1. These two joints act radially on the stem and on the tube for rendering the device watertight whenever the axial position of the push-button.

In order to produce a supplementary reliability of the watertightness, especially in the case of watches for underwater divers, which have to be able to resist high pressures, the head 4 carries, screwed thereon, a sleeve 9 outwardly knurled at 10. Since the push-button is prevented from rotating, owing to the corrugations 5–6, it is possible, manually, to screw and unscrew the sleeve 9 on the head 4 for bringing it in one or the other of two positions, respectively of work and of rest, represented respectively in FIGS. 1 and 2. When the sleeve 9 occupies its working position, its extremity, which is provided with an inner edge 9a, bears on a flat surface 11 of the rim 3; the sleeve 9 thus exerts an axial pull, in the direction of arrow 12, on the stem 1, owing which the waterproof joint 7 is axially compressed between an inner edge 2a of the tube 2 and a shoulder 1a of the stem 1. This axial compression of the joint 7 produces a deformation thereof, owing which the watertightness is ensured, even at the highest pressures. Moreover, the push-button is thus locked, which is also an advantage in the case of diver's watches in which, at some depths, the pressure exerted by the water on the push-buttons operates them untimely.

When the device has to be operated, the sleeve 9 is brought into the position shown in FIG. 2, in which its edge 9a is locked against the extremity of the head 4. In this position of the sleeve 9, the push-button can be moved axially freely; when a pressure is exerted on its head 4, for instance in the direction of the arrow 13 of FIG. 3, the push-button is moved against the action of its return spring, designated by 14, located in the head 4 and interposed between the bottom of head 4 and the extremity of the tube 2.

It is to be noted that the mechanism on which the device acts has not been shown since this is outside the scope of the invention, and that the slot, designated by 15, situated at the lower extremity of the stem 1, is without connection with this mechanism and is used only for the mounting of the device in the case of the timepiece; as a matter of fact, the stem 1 carrying the two waterproof joints 7 and 8 is introduced into the tube 2 from the outside while the head 4, provided with the sleeve 9 screwed thereon, is engaged on the tube 2. The stem 1 is then screwed in the head 4 by means of a screw-driver engaged in the slot 15.

What I claim is:
1. A watertight control device for a timepiece, in which a push-button is slidably mounted in a case and a deformable watertight joint is interposed between the push-button and the case, said device comprising means coupling said case and push-button for preventing rotation therebetween while permitting free axial sliding movement of the push-button relative to the case, and a sleeve threadably engaged on the push-button for movement between two end positions, one being a rest position, in which the sleeve allows the push-button to move freely, the other being a working position, in which the sleeve bears on the case and exerts an axial force on the push-button to compress the deformable waterproof joint and thereby increase its watertightness, and to lock the push-button.

2. In a device as claimed in claim 1 wherein a second waterproof joint is interposed between said push-button and the case, said second waterproof joint being resilient and acting radially against the push-button and the case for all axial positions of the push-button.

3. In a device as claimed in claim 1 wherein the case comprises a tube through which said push-button passes, said means for preventing rotation between the push-button and case comprising corrugations on the tube, and corrugations on the push-button engaged with said corrugations of the tube whereby the push-button is prevented from rotating while being able to move axially.

4. In a device as claimed in claim 3 wherein said push-button includes a stem passing through said tube and a hollow head secured to said stem at the outer extremity thereof, said head having an inner surface which faces the outer surface of the tube, said corrugations on the push-button being located on the inner surface of the head and the corrugations on the tube being located on the outer surface thereof.

5. In a device as claimed in claim 4 wherein said stem includes a shoulder secured thereto, said tube having an inner edge facing said shoulder, said watertight joint being engaged on said stem between said shoulder and the inner edge of the tube such that as the sleeve bears on the case the joint is compressed between the shoulder on the stem and the inner edge of the tube.

6. In a device as claimed in claim 1 wherein said push-button comprises a stem slidable in said case and a head on said stem, said head having an external thread thereon, said sleeve being threaded on said head and including an inner edge portion which bears against said head to prevent separation of the sleeve from the head in said rest position.

References Cited

UNITED STATES PATENTS 3,146,580  9/1964  Simon _____ 58—90

FOREIGN PATENTS 889,427  9/1953  Germany.

ROBERT S. WARD, Jr., *Primary Examiner.*

RICHARD B. WILKINSON, *Examiner.*

M. LORCH, *Assistant Examiner.*